United States Patent
Froc

(10) Patent No.: US 10,015,569 B1
(45) Date of Patent: Jul. 3, 2018

(54) METHOD AND MASTER DEVICE FOR DETECTING COLLISIONS IN OUT-OF-BAND COMMUNICATION CHANNEL

(71) Applicant: MITSUBISHI ELECTRIC CORPORATION, Tokyo (JP)

(72) Inventor: Gwillerm Froc, Rennes (FR)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/740,207

(22) PCT Filed: Jul. 7, 2016

(86) PCT No.: PCT/JP2016/003236
§ 371 (c)(1),
(2) Date: Dec. 27, 2017

(87) PCT Pub. No.: WO2017/006569
PCT Pub. Date: Jan. 12, 2017

(30) Foreign Application Priority Data

Jul. 9, 2015 (EP) .................................. 15176080

(51) Int. Cl.
*H04B 17/00* (2015.01)
*H04J 14/00* (2006.01)
(Continued)

(52) U.S. Cl.
CPC ...... *H04Q 11/0062* (2013.01); *H04J 14/0227* (2013.01); *H04Q 2011/0064* (2013.01); *H04Q 2011/0083* (2013.01)

(58) Field of Classification Search
CPC . G06F 1/10; G06F 1/04; H04L 7/0079; H04L 7/0075; H04B 10/2507; H04B 10/6162
(Continued)

(56) References Cited

U.S. PATENT DOCUMENTS

| 7,646,979 B1 * | 1/2010 | Ciancaglini | ......... H04J 14/0227 398/70 |
| 2007/0025739 A1 * | 2/2007 | Moore | ................... H04B 10/40 398/202 |

(Continued)

*Primary Examiner* — Don N Vo
(74) *Attorney, Agent, or Firm* — Birch, Stewart, Kolasch & Birch, LLP

(57) ABSTRACT

The invention relates to a method for detecting collisions in an out-of-band communication channel, implemented by a master device of an optical communications network enabling in-band communications and further comprising slave devices. The out-of-band communication channel enables transmissions of signalling information with respect to the in-band communications in the form of modulation symbols over successive symbol periods. Collisions occur when plural slave devices access the out-of-band communication channel by using carrier wavelengths matching each other. The master device: receives a signal via the out-of-band communication channel; oversamples the received signal, so as to obtain samples thereof, by using a frequency used for sampling the in-band communications or a submultiple derived therefrom; checks variations of magnitude of at least one parameter of the samples on a per symbol period basis; and detects a collision when the variations of each said parameter are greater than a predefined threshold.

9 Claims, 5 Drawing Sheets

(51) Int. Cl.
*H04Q 11/00* (2006.01)
*H04J 14/02* (2006.01)

(58) Field of Classification Search
USPC .......................................................... 398/36
See application file for complete search history.

(56) References Cited

U.S. PATENT DOCUMENTS

| | | | |
|---|---|---|---|
| 2009/0296681 A1* | 12/2009 | Tasa ................... | H04L 12/1881 370/345 |
| 2013/0201857 A1* | 8/2013 | Bhargava ............... | H04K 3/222 370/252 |
| 2016/0173439 A1* | 6/2016 | Kaliski, Jr. ............. | H04L 61/10 709/245 |

* cited by examiner

[Fig. 1]
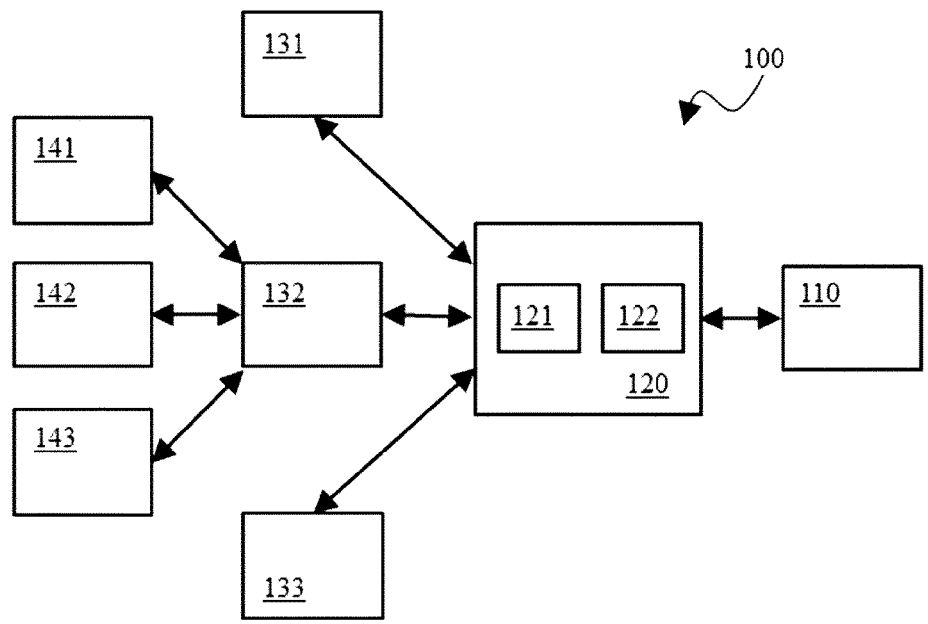
[Fig. 2]
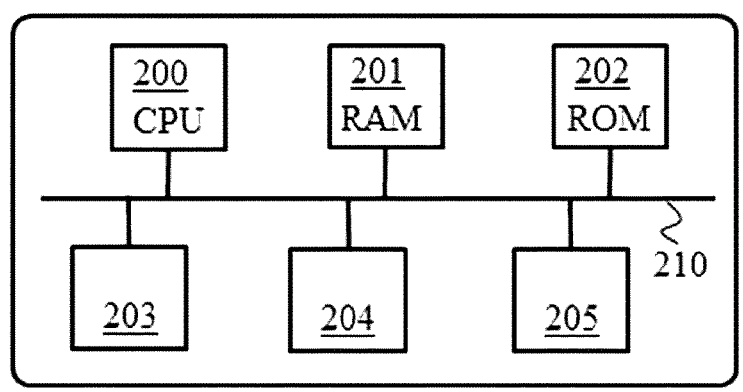

[Fig. 3]
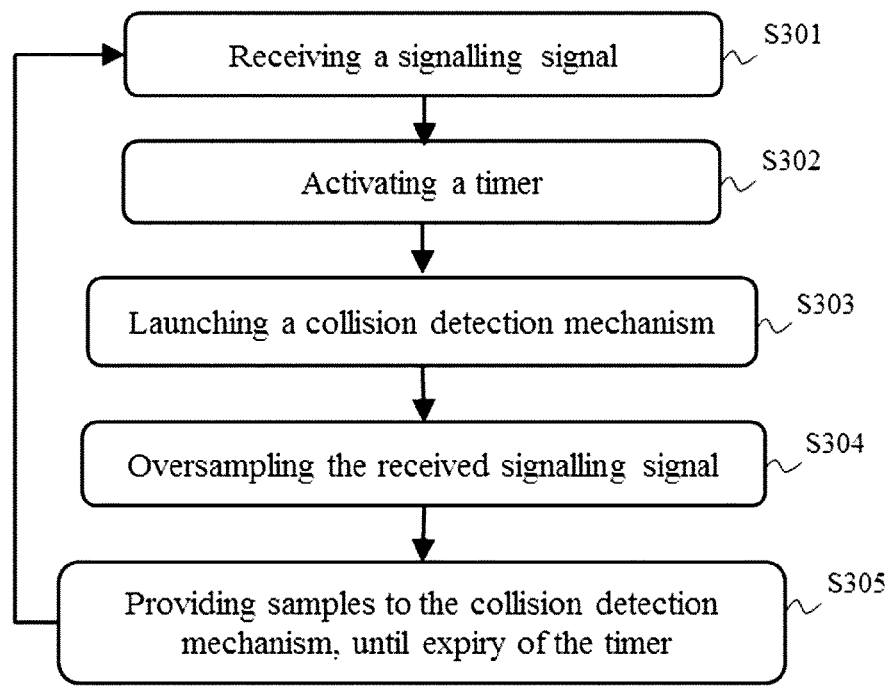

[Fig. 4]
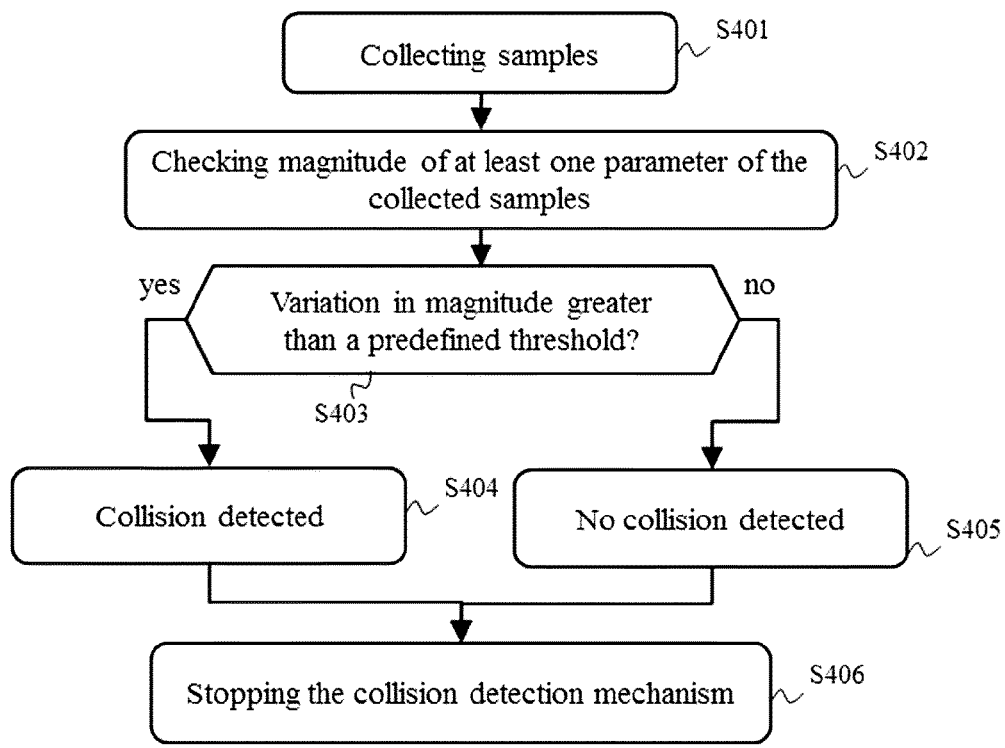

[Fig. 5]
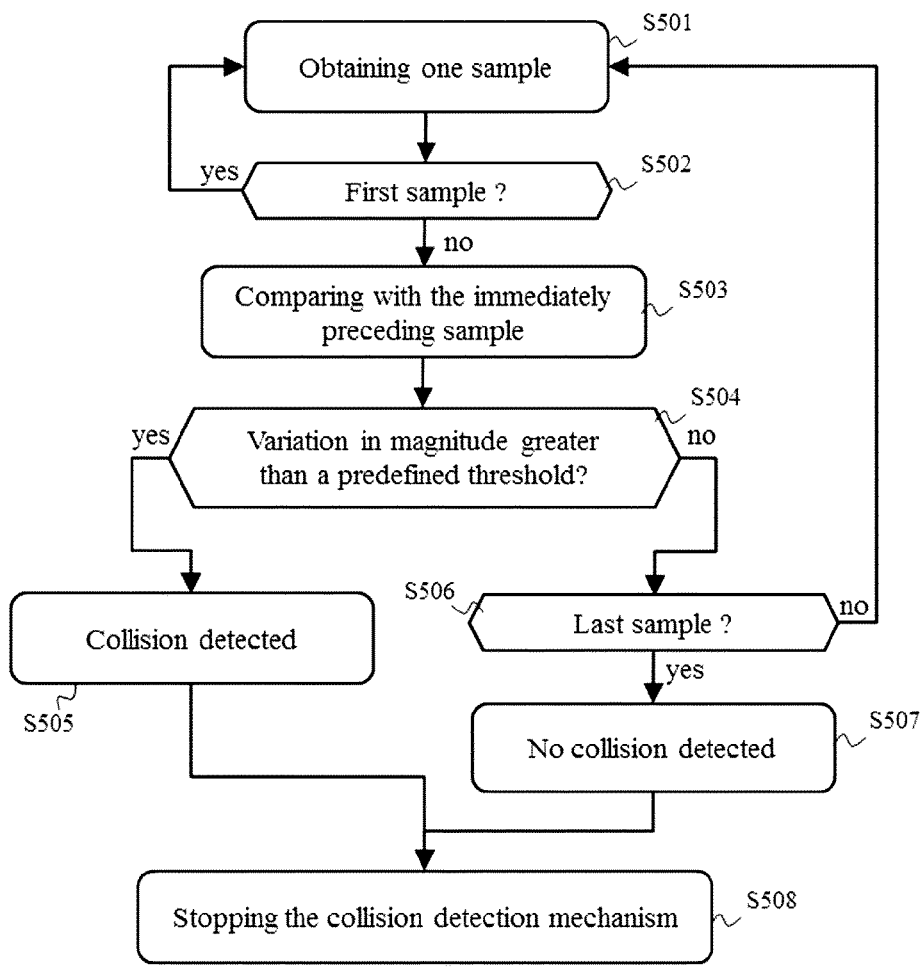

[Fig. 6]
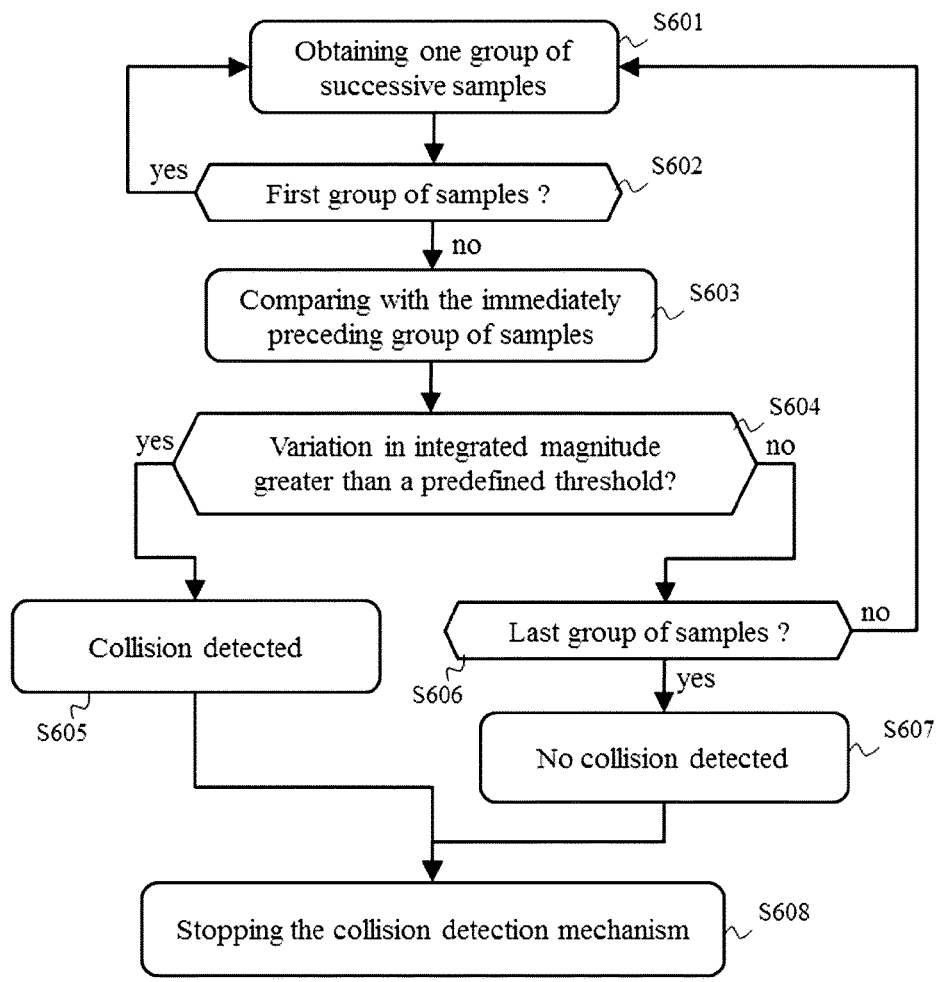

METHOD AND MASTER DEVICE FOR DETECTING COLLISIONS IN OUT-OF-BAND COMMUNICATION CHANNEL

TECHNICAL FIELD

The present invention generally relates to optical communications networks and more particularly to detecting collisions when accessing an out-of-band signalling communication channel.

BACKGROUND ART

Optical communications networks, and more particularly passive optical communications networks, are increasingly used to give network access to residential or office gateways, or data centres, or to ensure mobile backhauling for instance.

In an attempt to increase the number of user terminals to be served by one access system to the network, wavelength (or frequency) division multiplexing technologies have been developed. These technologies take advantage of multiplexing several optical signals using different carrier frequencies on a single optical fiber. Even though some user terminals may share the same carrier frequency, a frequency splitter is typically used to separate different frequencies in use, in order to increase the number of simultaneous optical transmissions. The frequency splitter is typically placed between the user terminals and a set of master terminals providing access to the rest of the network. For instance these master terminals provide access to a metropolitan network or a core network. Different techniques can be used to achieve such frequency splitting. We can cite thin films based systems, interference cavities as AWG (Array Wavelength Gratings) and FBG (Fiber Bragg Gratings) based systems.

The frequency splitter then comprises several optical band-pass filters, for each direction of communication. It is used to filter and combine optical signals issued by the user terminals toward the master terminal to which said user terminals are attached, each user terminal being then supposed to communicate with one master terminal. In the other direction, it is used to filter and spectrally split the optical signals issued by the master terminal toward the user terminals that are attached thereto.

SUMMARY OF INVENTION

Technical Problem

The difficulty in such an arrangement is to configure the transmission interfaces of the terminals. Indeed, these transmission interfaces shall be configured so that the carrier frequencies effectively used are substantially equal to the nominal frequencies of the respective optical band-pass filters via which they communicate. However, the nominal frequencies of the respective optical band-pass filters and/or the carrier frequencies resulting from the effective configuration of the transmission interfaces of the terminals may vary according to environmental conditions, such as temperature for instance. Use of non-temperature controlled environment is usually preferable, as it requires less complexity to operate, especially regarding the user terminals. Since the nominal frequencies of the respective optical band-pass filters may be a priori unknown and/or since the effective configuration of the transmission interfaces of the terminals may be a priori unknown, there is therefore a need to be able to appropriately define the configuration of the transmission interfaces of the terminals in order to lock the carrier frequencies effectively in use with respect to the effective nominal frequencies of the respective optical band-pass filters, for setting up communications between optical communication devices separated by such optical band-pass filters.

Communications within such optical communications networks are typically relying on baseband signals transmitted over an optical carrier frequency and are referred to as in-band communications. The baseband is for instance defined as the range from 1 GHz to 10 GHz. The baseband corresponds to the spectrum range in which are located components resulting from any in-band communication signal which are significant to perform the decoding of the in-band communication signal.

In order to perform the aforementioned frequency locking and in order not to interfere with in-band communications that are established within the optical communications network or in order to prevent any signalling from using the spectrum resource used by the in-band communications, an out-of-band communication channel may be established for allowing implementing a locking protocol or any other signalling protocol. Out-of-band communications between two optical communication devices use the same carrier frequency than in-band communications between said two optical communication devices. The term out-of-band indicates that the communications occurring within the out-of-band communication channel rely on a spectrum part distinct from the baseband of the in-band communications, typically much lower in terms of frequency than the in-band communications baseband lower limit, which means that the baud rate in the out-of-band communication channel is much lower than the baud rate in the baseband of the communication signal. Regarding frequency locking, a possible approach is that an initiating device among first and second optical communication devices transmits via the out-of-band communication channel a locking signal to the other optical communication device among the first and second optical communication devices, by using a given carrier frequency. The initiating device performs so by scanning various frequencies until matching the nominal frequency of the concerned optical band-pass filter.

Such an out-of-band communication channel may be established for providing other types of signalling information. However, when two user terminals use the same carrier frequency to access the out-of-band communication channel toward the master terminal to which said terminals are attached, collisions may occur since said user terminals are not able to sense the medium before transmitting signals (contrary to most radiofrequency or wired systems), which may render difficult (even though potentially not impossible) signal decoding at the master terminal's end.

Solution to Problem

It is therefore desirable to be able to detect such collisions without having to rely on decoding of the received signal, in order to increase reactivity against the collisions (e.g. requesting retransmission).

It is furthermore desirable to provide a cost-effective solution to the aforementioned problem.

The present invention concerns a method for detecting collisions in an out-of-band communication channel, the method being implemented by a master device of an optical communications network comprising slave devices connected to the master device via optical fiber, the optical communications network being adapted to enable in-band communications, the out-of-band communication channel being intended to enable transmissions of signalling information with respect to the in-band communications in the form of modulation symbols over successive symbol periods, collisions occur in the out-of-band communication channel when plural slave devices access the out-of-band communication channel by using respective carrier wavelengths that match each other. The method is such that the master device performs: receiving a signal via the out-of-band communication channel; oversampling the received signal starting from an instant of reception of said signal, so as to obtain samples thereof, by using a frequency that corresponds to a sampling frequency used for the in-band communications, or to a submultiple derived therefrom, such that the quantity of samples thus obtained per symbol period is enough high to consider that noise over the out-of-band communication channel is self-compensated over said quantity of samples; checking variations of magnitude of at least one parameter of the samples on a per symbol period basis, each said parameter being one parameter among amplitude, phase, and frequency and being chosen for checking said variations according to the modulation that was applied on said signal for transmission via the out-of-band communication channel; and detecting a collision when the variations of each said parameter are greater than a predefined threshold equal to or greater than noise variance over the out-of-band communication channel regarding said parameter.

Thus, the oversampling is such that noise is self-compensated over each symbol period. Therefore, by checking the variations of magnitude of at least one parameter among amplitude, phase, and frequency, the master device is able to detect a collision in the out-of-band communication channel in a simple manner, without having to rely on decoding of the received signal. The solution is cost-effective since the oversampling relies on the sampling frequency used for the in-band communications, or to a submultiple derived therefrom.

According to a particular feature, the master device activates, on a per symbol period basis from the instant of reception of said signal, a timer having a duration equal to said symbol period, and in that the master device processes for collision detection samples obtained until the expiry of the timer minus a margin M, wherein the margin intends to withdraw samples that are related to inter-symbol transitions.

Thus, inter-symbol transitions do not affect the collision detection.

According to a particular feature, Phase Shift Keying or Differential Phase Shift Keying modulation is used by the slave devices for transmitting signalling information via the out-of-band communication channel, and in that amplitude is said parameter.

Thus, collision detection can be easily detected, since the out-of-band communication channel is quasi-static due to the optical nature of the medium (optical fiber).

According to a particular feature, each said parameter is one parameter among amplitude, phase, and frequency, on which the modulation that was applied on said signal for transmission via the out-of-band communication channel acted.

According to a particular feature, the master device checks the variations of magnitude of at least one parameter of the samples of each symbol period, by integrating said parameter over groups of samples formed by applying a sliding window within said symbol period and by determining differences between the integrated values of each said parameter for each couple of consecutive groups of samples within said symbol period.

Thus, a trade-off can be found between reactivity of the collision detection and potential false detections of collisions.

According to a particular feature, the master device checks the variations of magnitude of at least one parameter of the samples of each symbol period, by determining differences between the values of each said parameter for each couple of consecutive samples within said symbol period.

Thus, collision detection is reactive.

According to a particular feature, the master device checks the variations of magnitude of at least one parameter of the samples of each symbol period, by determining a difference between a minimum value of each said parameter and a maximum value of each said parameter within said symbol period.

Thus, collision detection can be easily performed.

According to another aspect, the present invention concerns a master device adapted for detecting collisions in an out-of-band communication channel, the master device being intended to be used in an optical communications network further comprising slave devices connected to the master device via optical fiber, the optical communications network being adapted to enable in-band communications, the out-of-band communication channel being intended to enable transmissions of signalling information with respect to the in-band communications in the form of modulation symbols over successive symbol periods, collisions occur in the out-of-band communication channel when plural slave devices access the out-of-band communication channel by using respective carrier wavelengths that match each other. The master device is such that it comprises: an receiver to receive a signal via the out-of-band communication channel; an oversampling circuitry to oversample the received signal starting from an instant of reception of said signal, so as to obtain samples thereof, by using a frequency that corresponds to a sampling frequency used for the in-band communications, or to a submultiple derived therefrom, such that the quantity of samples thus obtained per symbol period is high enough to consider that noise over the out-of-band communication channel is self-compensated over said quantity of samples; a checking circuitry to check variations of magnitude of at least one parameter of the samples on a per symbol period basis, each said parameter being one parameter among amplitude, phase, and frequency and being chosen for checking said variations according to the modulation that was applied on said signal for transmission via the out-of-band communication channel; and a detector to detect a collision when the variations of each said parameter are greater than a predefined threshold equal to or greater than noise variance over the out-of-band communication channel regarding said parameter.

The present invention also concerns a computer program that can be downloaded from a communications network and/or stored on a medium that can be read by a computer and run by a processor. This computer program comprises instructions for implementing the aforementioned method in any one of its various embodiments, when said program is run by the processor. The present invention also concerns an information storage medium, storing a computer program comprising a set of instructions for implementing the aforementioned method in any one of its various embodiments, when the stored instructions are read by a computer and run by a processor.

The characteristics of the invention will emerge more clearly from a reading of the following description of an example of embodiment, said description being produced with reference to the accompanying drawings.

BRIEF DESCRIPTION OF DRAWINGS

FIG. 1 schematically represents an arrangement of an optical communications network, including a master device and a plurality of slave devices, in which the present invention may be implemented.

FIG. 2 schematically represents an arrangement of the master device of the optical communications network.

FIG. 3 schematically represents an algorithm, performed by the master device, for processing signalling signals received via the out-of-band communication channel.

FIG. 4 schematically represents an algorithm, performed by the master device, of a first embodiment for detecting a collision in the out-of-band communication channel.

FIG. 5 schematically represents an algorithm, performed by the master device, of a second embodiment for detecting a collision in the out-of-band communication channel.

FIG. 6 schematically represents an algorithm, performed by the master device, of a third embodiment for detecting a collision in the out-of-band communication channel.

DESCRIPTION OF EMBODIMENTS

FIG. 1 schematically represents an arrangement of a passive optical network in which the present invention may be implemented.

It has to be noticed that, since wavelength and frequency are tied together through a direct inverse relationship, these two terms are indifferently used by the one skilled in the art, as they refer to the same concept.

The description hereafter is detailed in the context of a passive optical communications network, but can be similarly applied in the more general context of optical communications networks.

The passive optical communications network 100 comprises a master device 110, a plurality of slave devices 141, 142, 143, and a spectral splitter device 120. The slave devices 141, 142, 143 are interconnected with the master device 110 via the spectral splitter device 120. Power splitters, as described hereafter, may be placed between the slave devices and the spectral filter device 120 in order to increase the number of slave devices that can be interconnected with the master device 110. All the interconnections of the passive optical communications network 100 are performed by using optical fiber. A particular hardware-platform embodiment for implementing the master device 110 and the slave devices 141, 142, 143 is detailed hereafter with regard to FIG. 2.

In the context of the passive optical communications network 100, the slave devices 141, 142, 143 are of ONU (Optical Network Units) type. ONUs are typically intended to be located at the end-user households or at remote radio heads for fronthauling applications.

In the context of the passive optical communications network 100, the master device 110 is of OLT (Optical Line Terminal) type. It enables ONUs to access a metropolitan or a core network (not shown).

The slave devices 141, 142, 143 may be connected to the spectral splitter device 120 via a power splitter device 132. The power splitter device 132 is a passive splitter that separates the input signal, in the downlink direction (from the master device 110 toward the slave devices), into a plurality of corresponding signals which power is divided by the number of links towards the slave devices 141, 142, 143. The signals output by the power splitter device 132, on each link in the downlink direction, contain the same information as the input signal, the power splitter device 132 having only impact on the power of the signals.

Other slave devices may be connected to the spectral splitter device 120 via power splitter devices 131, 133. Each power splitter device 131, 132, 133, and the slave devices connected to, form a network of PON (Passive Optical Network) type with the master device to which said slave devices are attached. The PONs operate on respective wavelength bands, as filtered by the spectral splitter device 120. To achieve this, the spectral splitter device 120 comprises a pair of optical band-pass sets of filters for each PON, aiming at filtering respective wavelength bands, and thus enabling the spectral splitter device 120 to perform Wavelength Division Multiplexing.

Therefore, as shown on FIG. 1, the spectral splitter device 120 comprises sets 121, 122 of optical band-pass filters dedicated to the transmissions over the PON of the power splitter device 132 and its associated slave devices 141, 142, 143. The set of filters 122, called hereinafter uplink filters, is in charge of filtering the optical signals in the uplink direction (from the slave devices 141, 142, 143 to the master device 110, which are in the same PON). The set of filters 121, called hereinafter downlink filters, is in charge of filtering the optical signals in the downlink direction. Each filter of the sets 121, 122 is a band-pass filter defined by a nominal wavelength, also referred to as centre wavelength, as well as a bandwidth. Each filter of the sets 121, 122 may also be defined by a spectral shape.

For a considered uplink or downlink direction, all the filters of the spectral splitter device 120 have preferably the same bandwidth value and are preferably spaced by a fixed spectral distance. However, the nominal wavelengths of the filters are a priori unknown. The spectral splitter device 120 being preferably passive, the nominal wavelengths of the filters may vary as a function of the temperature of the spectral splitter device 120 (heat generated by the spectral splitter device 120 or by equipment located nearby, or environmental conditions).

It has to be noticed that, the band-pass filters being designed upon the same constraints, the bandwidth value of the filters and the spectral distance between the filters are substantially independent of the temperature variations.

In addition, the effective carrier wavelength corresponding to a given configuration of the optical transmission interface of either a slave device 141, 142, 143 or the master device 110 may not be known.

Therefore, the slave devices 141, 142, 143 need to be configured for transmitting optical signals in the uplink direction on carrier wavelengths that are substantially equal to the nominal frequency of the concerned uplink filter of the set 122. In addition, the master device 110 needs to be configured for transmitting optical signals in the downlink direction on a carrier wavelength that is substantially equal to the nominal frequency of the concerned downlink filter of the set 121. In other words, carrier frequencies need to be locked and an out-of-band communication channel is implemented for doing so, as detailed hereinafter. Said out-of-band communication channel may further be used to transmit other signalling information. More particularly, the out-of-band communication channel is intended to enable transmissions of signalling information with respect to the in-band communications in the form of modulation symbols over successive symbol periods. Such signalling information may for instance include class of service or data rate information related to the in-band communications traffic from said slave device toward the master device, or any other information known by said slave device and useful for the master device 110 for enabling management of the in-band communications. Such signalling information may also include operational information, such as battery remaining load, environmental temperature, when the concerned slave device is equipped with adapted sensors, or any other information known by said slave device and useful for the master device 110 for enabling operational management of the passive optical communications network 100.

It can be noticed that a wavelength in the passband of a given filter is considered as substantially equal to the nominal frequency of said given filter.

It can be noted that the nominal wavelengths of filters of the sets 121, 122 may be identical. It means that either a same carrier wavelength or different carrier wavelengths can be used in the downlink and uplink directions.

It can further be noted that an equivalent arrangement can be obtained by sticking filtering films on respective reception diodes of the optical communications network instead of using the spectral splitter device 120. In this case too, uplink and downlink filters are present on the path between the master device 110 and the slave devices.

In order to allow locking the carrier frequency between one slave device, such as the slave device 141, and the master device 110, an approach is that the slave device transmits a locking signal via the out-of-band communication channel. This locking signal is transmitted over a carrier frequency selected, e.g. arbitrarily, by said slave device. When the out-of-band communication channel is already setup from the master device 110 to said slave device, the master device 110 can transmit an out-of-band message to the slave device when the locking signal is received by the master device 110 (when the carrier frequency used for the locking signal matches the nominal frequency of the concerned uplink filter of the set 122). When no such out-of-band message is received by said slave device within a predefined time period following the transmission of the locking signal, said slave device reiterates the process with another carrier frequency, and so on until having used a carrier frequency that matches the nominal frequency of the concerned uplink filter of the set 122. When an in-band communication is already setup from the master device 110 to said slave device, the master device 110 may use instead an in-band message to respond to the locking signal. Other approaches can be implemented in order to lock the carrier frequency effectively in use so as to match the nominal frequency of the concerned uplink filter of the set 122. For instance, locking the carrier frequency can be achieved in the uplink direction using a mirror-based approach described in patent application EP 2466768 A1.

In order to avoid generating interferences with in-band communications already setup in the optical communications network 100, for instance from the slave device 142 to the master device 110, it is proposed to generate a particularly shaped locking signal. Any receiver device of the optical communications network 100, such as the master device 110, is thus able to distinguish the locking signal from signals of an already-setup in-band communication and to continue decoding the signals exchanged within said already-setup in-band communication. The locking signal is a modulated signal obtained from information to be transmitted to the master device 110. In a particular embodiment, the modulation is for instance performed by a circular function which frequency $\Omega$ is lower than the baud rate of the in-band communications. In other words, the frequency $\Omega$ is lower than the lower limit of the baseband, wherein it is recalled that the baseband corresponds to a range of frequencies that have to be filtered out to decode the in-band communication signals. In a preferred embodiment, the frequency $\Omega$ is significantly lower than the lower limit of the baseband. For instance, the frequency $\Omega$ equals 1 MHz and the lower limit of the baseband is 1 GHz (or up to 10 GHz). Different kind of modulation techniques can be used to provide signalling information via the locking signal. The locking signal may be, for instance, modulated using Amplitude Shift Keying (ASK) modulation or Frequency Shift Keying (FSK) modulation or Phase Shift Keying (PSK) modulation, or any kind of modulation derived therefrom, such as a modulation of differential type (Differential Frequency Shift Keying, . . . ). In a preferred embodiment, said slave device apodizes the modulated signal, i.e. removes or smoothes sharp discontinuities in the modulated signal. Said slave device thus ensures that the apodized modulated locking signal smoothly tends toward zero at the beginning and at the end of the signal so that no transient frequencies in the baseband are generated in the locking signal. Embodiments for generating out-of-band communication signals and discriminating said out-of-band communication signals from in-band communication signals are disclosed in the European patent application published under the reference EP 2 621 112 A1.

As already mentioned, the out-of-band communication channel may be used for transmitting other signalling information than in the scope of the carrier frequency locking process. Said signalling information is transmitted via the out-of-band communication channel with the same signal shape as the aforementioned locking signal. Signalling information can thus be coded by relying on the modulation used to form the out-of-band signal. Signalling information is preferred compared with other types of information, since the baud rate achievable via the out-of-band communication channel is, by definition, far lower than the baud rate achievable via the in-band communication channel, and therefore information transmitted via the out-of-band communication channel is expected to be limited in terms of size, in order to limit occurrences of collisions and to ease sharing access to the out-of-band communication channel between the slave devices. Collisions occur in the out-of-band communication channel when plural slave devices access the out-of-band communication channel by using respective carrier wavelengths that match each other. Said carrier wavelengths match each other when the carrier wavelengths are within the same detection channel from the standpoint of the master device 110 (carrier wavelengths detected by the master device 110 as crossing the same uplink filter of the set 122).

It can be noted that such collisions occur also in the scope of PON-only optical networks, since in that case the slave devices communicate with the master device within the same detection channel from the standpoint of the master device 110 (since, in the scope of FIG. 1, the spectral splitter device 120 aims at creating plural independent detection channels usable by distinct master devices).

An algorithm performed by the master device 110 for processing signalling signals received via the out-of-band communication channel is detailed hereafter with regard to FIG. 3 and several embodiments of an algorithm performed by the master device 110 for detecting a collision of signalling signals transmitted via the out-of-band communication channel are detailed hereafter with regard to FIGS. 4 to 6.

FIG. 2 schematically represents an arrangement of the master device 110. According to the shown arrangement, the master device 110 comprises the following components interconnected by a communications bus 210: a processor, microprocessor, microcontroller or CPU (Central Processing Unit) 200; a RAM (Random-Access Memory) 201; a ROM (Read-Only Memory) 202; a device 203 adapted to read information stored on storage means; a first communication interface 204, aiming at being connected to the spectral splitter device 120 for transmitting and receiving optical signals; and, a second communication interface 205, aiming at being connected to the metropolitan or core network.

CPU 200 is capable of executing instructions loaded into RAM 201 from ROM 202 or from any other storage means. After the master device 110 has been powered on, CPU 200 is capable of reading instructions from RAM 201 and executing these instructions. The instructions form one computer program that causes CPU 200 to perform some or all of the steps of the algorithms described hereafter with regard to FIGS. 3 to 6.

It can be noted that the slave devices 141, 142, 143 may also be implemented on the basis of the arrangement schematically shown in FIG. 2. In this case, the first communication interface 204 allows communicating with the master device 110, potentially through the spectral splitter device 120, and the second communication interface 205 allows connecting the considered slave device 141, 142, 143 to a local area network, such as a home network.

Any and all steps of the algorithms described hereafter with regard to FIGS. 3 to 6 may be implemented in software by execution of a set of instructions or program by a programmable computing machine, such as a DSP (Digital Signal Processor) or a microcontroller; or else implemented in hardware by a machine or a dedicated component, such as an FPGA (Field-Programmable Gate Array) or an ASIC (Application-Specific Integrated Circuit).

FIG. 3 schematically represents an algorithm, performed by the master device 110, for processing signalling signals received via the out-of-band communication channel.

In a step S301, the master device 110 starts receiving a signalling signal via the out-of-band communication channel. Such signalling signals are asynchronously transmitted by the slave devices via the out-of-band communication channel, which means that plural signalling signals may be concurrently received by the master device 110. As the probability that the master device 110 starts receiving signalling signals from two or more respective slave devices exactly at the same instant is rather low, the master device 110 typically starts receiving a first signalling signal from a first slave device and may potentially start receiving a second signalling signal from a second slave device while the first signalling signal is still under reception, which means in that case that a collision occurs when the carriers wavelengths in use match each other. Such collisions may also occur in the scope of Time Division Multiple Access (TDMA) schemes when time slots of the TDMA scheme can be used by plural concurrent devices.

In a step S302, the master device 110 activates a timer having a predefined duration T. The duration T equals a symbol period on the out-of-band communication channel.

In a step S303, the master device 110 launches a collision detection mechanism. Three embodiments of the collision detection mechanism are detailed hereafter with regard to FIGS. 4 to 6.

In a step S304, the master device 110 performs oversampling of the signal received in the step S301, so as to obtain samples thereof. The oversampling is performed by using a frequency that corresponds to a sampling frequency used for the in-band communications, or a submultiple derived therefrom (i.e. from the sampling frequency used for the in-band communications), the oversampling is such that the quantity of samples thus obtained per symbol period is enough high to consider that noise over the out-of-band communication channel is self-compensated over said quantity of samples. This allows reusing, for the collision detection within the scope of the out-of-band communication channel, components of the master device 110 that are normally designed for processing in-band signals.

In a step S305, the master device 110 provides the samples obtained in the step S304 to the collision detection mechanism, until expiry of the timer activated in the step S302. Once expiry of the timer is reached, the step S301 is repeated and the signal under reception, if still present, is processed for another symbol period.

In a particular embodiment, the master device 110 only provides to the collision detection mechanism the samples obtained in the step S304 up to an instant that corresponds to the expiry of the timer minus a margin M, wherein the margin intends to withdraw, from the samples analysed by the collision detection mechanism, samples that are related to inter-symbol transitions.

FIG. 4 schematically represents an algorithm, performed by the master device 110, of a first embodiment for detecting a collision in the out-of-band communication channel (collision detection mechanism). The collision detection mechanism, as launched in the step S302, is implemented by the master device 110. In the scope of the algorithm of FIG. 4, it is considered that a potential collision can be detected once all samples in a single symbol period are collected.

In a step S401, the master device 110 collects the samples, as obtained by the oversampling operation performed in the step S304 during one symbol period. It is reminded that the signalling signals as transmitted by the slave devices are modulated according to a predefined modulation scheme, and therefore the signalling signals are respectively transmitted in the form of (modulation) symbols over successive symbol periods.

In a step S402, the master device 110 checks the magnitude of at least one parameter of the collected samples. Each said parameter is one parameter among amplitude, phase, and frequency and is chosen for checking magnitude variations thereof according to the modulation that was applied on said signal for transmission via the out-of-band communication channel.

According to a particular embodiment, PSK or Differential PSK modulation is used by the slave devices for transmitting the signalling signals via the out-of-band communication channel, and amplitude is said parameter chosen for checking magnitude variations thereof. Indeed, since the out-of-band communication channel is quasi-static due to the optical nature of the medium (optical fiber), it means that the signalling signal's envelope is expected to be substantially constant over each symbol period.

According to a particular embodiment in variant, said parameter chosen for checking magnitude variations thereof is one parameter among amplitude, phase, and frequency, on which the modulation that was applied on said signal for transmission via the out-of-band communication channel acted. In ASK modulation or the like, amplitude is the parameter on which the modulation acts; in PSK modulation or the like, phase is the parameter on which the modulation acts; in FSK modulation or the like, frequency is the parameter on which the modulation acts; in QAM (Quadrature Amplitude Modulation) modulation or the like, amplitude and phase are the parameters on which the modulation acts; etc.

In a step S403, the master device 110 checks whether variations in magnitude of each considered parameter of the collected samples are greater than a respective predefined threshold TH. When plural parameters of the samples are considered, each parameter is compared with a corresponding threshold TH. For example, in QAM modulation, the amplitude of the samples can be compared with an amplitude threshold and/or the phase of the samples can be compared with a phase threshold. It can also be noted that, even though QAM modulation is used, only one parameter among phase and amplitude may be checked by the master device 110 for collision detection.

The master device 110 checks said variations by determining a difference between a maximum value of said parameter(s) and a maximum value of said parameter(s) within said symbol period. When the variations in magnitude of each considered parameter of the collected samples are greater than the predefined threshold TH, a step S404 is performed; otherwise, a step S405 is performed. The predefined threshold TH equals to or is greater than noise variance over the out-of-band communication channel regarding said parameter with the variations of magnitude of which the threshold TH is compared. In that sense, the threshold TH depends on the modulation applied to transmit the signalling signal via the out-of-band communication channel.

In the step S404, the master device 110 considers that a collision is detected on the out-of-band communication channel. The master device 110 is then able to apply adequate countermeasures, such as requesting retransmission of the signalling signals or generating an alarm signal to be handled by a managing entity, or even to simply grow statistics of uplink communications via the out-of-band communication channel. In one embodiment, as a consequence of the collision detection, the master device 110 requests that the access to the out-of-band communication channel is temporarily switched to a TDMA scheme wherein collisions are expected to be avoided, or at least the number of collision occurrences is expected to be reduced, by distributing access to the out-of-band communication channel over predetermined time slots. Then, a step S406 is performed.

In the step S405, the master device 110 considers that no collision is detected on the out-of-band communication channel. Then, the step S406 is performed.

In the step S406, the master device 110 stops the collision detection mechanism (all samples of the symbol period have been processed). If another symbol has to be processed, a new iteration of the step S303 is expected to launch once again the collision detection mechanism.

FIG. 5 schematically represents an algorithm, performed by the master device 110, of a second embodiment for detecting a collision in the out-of-band communication channel (collision detection mechanism). In the scope of the algorithm of FIG. 5, it is considered that a potential collision can be detected by relying on a sample by sample analysis during a symbol period. The algorithm of FIG. 5 can thus be performed as the samples are obtained.

In a step S501, the master device 110 obtains one sample among the samples obtained by the oversampling operation performed in the step S304 during one symbol period. It is reminded that the signalling signals as transmitted by the slave devices are modulated according to a predefined modulation scheme, and therefore the signalling signals are respectively transmitted in the form of (modulation) symbols over successive symbol periods.

In a step S502, the master device 110 checks whether the sample obtained in the step S501 is the first one in sequence since the collision detection mechanism has been launched. When the sample obtained in the step S501 is the first one in sequence, the step S501 is repeated in order to obtain the second sample in sequence since the collision detection mechanism has been launched; otherwise, a step S503 is performed.

In the step S503, the master device 110 compares the magnitude of at least one parameter of the sample obtained during the immediately preceding execution of the step S501 with the magnitude of the same parameter(s) of the immediately preceding sample in sequence. As for the context of execution of the algorithm of FIG. 4, each said parameter is one parameter among amplitude, phase, and frequency and is chosen for checking magnitude variations thereof according to the modulation that was applied on said signal for transmission via the out-of-band communication channel.

In a step S504, the master device 110 checks whether a variation in magnitude of each considered parameter of the samples, as compared in the step S503, is greater than the respective predefined threshold TH. The master device 110 thus checks said variations by determining differences between the values of said parameter(s) for each couple of consecutive samples within said symbol period. When the variation in amplitude of each considered parameter of said samples is greater than the respective predefined threshold TH, a step S505 is performed; otherwise, a step S506 is performed. As for the context of execution of the algorithm of FIG. 4, the predefined threshold TH equals to or is greater than noise variance over the out-of-band communication channel regarding said parameter with the variations of magnitude of which the threshold TH is compared.

In the step S505, the master device 110 considers that a collision is detected on the out-of-band communication channel. The master device 110 is then able to apply the adequate countermeasures, such as requesting retransmission of the signalling signals or generating an alarm signal to be handled by a managing entity, or even to simply grow statistics of uplink communications via the out-of-band communication channel. Then, a step S508 is performed.

In the step S506, the master device 110 checks whether the sample obtained during the immediately preceding execution of the step S501 is the last sample in sequence for the considered symbol period. When the sample obtained during the immediately preceding execution of the step S501 is the last sample in sequence, a step S507 is performed; otherwise, the step S501 is repeated in order to obtain the next sample in sequence.

In the step S507, the master device 110 considers that no collision is detected on the out-of-band communication channel. Then, the step S508 is performed.

In the step S508, the master device 110 stops the collision detection mechanism (all samples of the symbol period have been processed). If another symbol has to be processed, a new iteration of the step S303 is expected to launch once again the collision detection mechanism.

FIG. 6 schematically represents an algorithm, performed by the master device 110, of a third embodiment for detecting a collision in the out-of-band communication channel (collision detection mechanism). In the scope of the algorithm of FIG. 6, it is considered that a potential collision can be detected by relying on a per group of samples analysis during a symbol period. Successive samples are then gathered by groups of predefined cardinality in order to perform integration and thus reduce noise impact on the samples analysis. The algorithm of FIG. 6 can thus be performed as said groups of samples are obtained.

In a step S601, the master device 110 obtains one group of successive samples among the samples obtained by the oversampling operation performed in the step S304 during one symbol period. It is reminded that the signalling signals as transmitted by the slave devices are modulated according to a predefined modulation scheme, and therefore the signalling signals are respectively transmitted in the form of (modulation) symbols over successive symbol periods.

In a step S602, the master device 110 checks whether the group of successive samples obtained in the step S601 is the first one in sequence since the collision detection mechanism has been launched. When the sample obtained in the step S601 is the first one in sequence, the step S601 is repeated in order to obtain the second group of successive samples in sequence since the collision detection mechanism has been launched; otherwise, a step S603 is performed. For instance, the groups of samples are defined as respective adjacent windows of predefined size (consisting of a predefined quantity of samples). In a preferred embodiment, the groups of samples are defined thanks to a sliding window of predefined size, iteratively shifted by one or more samples within the considered symbol period, from the definition of one group of samples to the definition of the immediately following group of samples in sequence.

In the step S603, the master device 110 compares the integrated magnitude of at least one parameter of the group of samples obtained during the immediately preceding execution of the step S601 with the integrated magnitude of the same parameter(s) of the immediately preceding group of samples in sequence. As for the context of execution of the algorithms of FIGS. 4 and 5, each said parameter is one parameter among amplitude, phase, and frequency and is chosen for checking magnitude variations thereof according to the modulation that was applied on said signal for transmission via the out-of-band communication channel.

In a step S604, the master device 110 checks whether a variation in integrated magnitude of each considered parameter of the groups of samples, as compared in the step S603, is greater than the respective predefined threshold TH. The master device 110 thus checks said variations by determining differences between the integrated values of said parameter(s) for each couple of consecutive groups of samples within the considered symbol period. When the variation in integrated magnitude of each considered parameter of said groups of samples is greater than the respective predefined threshold TH, a step S605 is performed; otherwise, a step S606 is performed. As for the context of execution of the algorithms of FIGS. 4 and 5, the predefined threshold TH equals to or is greater than noise variance over the out-of-band communication channel regarding said parameter with the variations of magnitude of which the threshold TH is compared.

In the step S606, the master device 110 considers that a collision is detected on the out-of-band communication channel. The master device 110 is then able to apply the adequate countermeasures, such as requesting retransmission of the signalling signals or generating an alarm signal to be handled by a managing entity, or even to simply grow statistics of uplink communications via the out-of-band communication channel. Then, a step S608 is performed.

In the step S607, the master device 110 checks whether the group of samples obtained during the immediately preceding execution of the step S601 is the last group of samples in sequence for the considered symbol period. When the group of samples obtained during the immediately preceding execution of the step S601 is the last group of samples in sequence, a step S607 is performed; otherwise, the step S601 is repeated in order to obtain the next group of samples in sequence.

In the step S607, the master device 110 considers that no collision is detected on the out-of-band communication channel. Then, the step S608 is performed.

In the step S608, the master device 110 stops the collision detection mechanism (all samples of the symbol period have been processed). If another symbol has to be processed, a new iteration of the step S303 is expected to launch once again the collision detection mechanism.

In view of the three embodiments respectively described with regard to FIGS. 4 to 6, the collision detection mechanism consists in: oversampling a signal received via the out-of-band communication channel on a symbol period basis starting from the instant of reception of the signal, so as to obtain samples of the signal as received; checking variations of magnitude of at least one parameter of the samples, each said parameter being among amplitude, phase, and frequency and being chosen for checking magnitude variations thereof according to the modulation that was applied on said signal for transmission via the out-of-band communication channel; and detecting collision when the variations of magnitude of each said parameter are greater than a predefined respective threshold TH, wherein the predefined threshold TH equals to or is greater than noise variance over the out-of-band communication channel regarding said parameter.

The invention claimed is:

1. A method for detecting collisions in an out-of-band communication channel, the method being implemented by a master device of an optical communications network comprising slave devices connected to the master device via optical fiber, the optical communications network being adapted to enable in-band communications, the out-of-band communication channel being intended to enable transmissions of signalling information with respect to the in-band communications in the form of modulation symbols over successive symbol periods, collisions occur in the out-of-band communication channel when plural slave devices access the out-of-band communication channel by using respective carrier wavelengths that match each other, characterized in that the master device performs:
receiving a signal via the out-of-band communication channel;
oversampling the received signal starting from an instant of reception of said signal, so as to obtain samples thereof, by using a frequency that corresponds to a sampling frequency used for the in-band communications, or to a submultiple derived therefrom, such that the quantity of samples thus obtained per symbol period is enough high to consider that noise over the out-of-band communication channel is self-compensated over said quantity of samples;
checking variations of magnitude of at least one parameter of the samples on a per symbol period basis, each said parameter being one parameter among amplitude, phase, and frequency and being chosen for checking said variations according to the modulation that was applied on said signal for transmission via the out-of-band communication channel; and
detecting a collision when the variations of each said parameter are greater than a predefined threshold equal to or greater than noise variance over the out-of-band communication channel regarding said parameter.

2. The method according to claim 1, characterized in that the master device activates, on a per symbol period basis from the instant of reception of said signal, a timer having a duration equal to said symbol period, and in that the master device processes for collision detection samples obtained until the expiry of the timer minus a margin M, wherein the margin intends to withdraw samples that are related to inter-symbol transitions.

3. The method according to claim 1, characterized in that Phase Shift Keying or Differential Phase Shift Keying modulation is used by the slave devices for transmitting signalling information via the out-of-band communication channel, and in that amplitude is said parameter.

4. The method according to claim 1, characterized in that each said parameter is one parameter among amplitude, phase, and frequency, on which the modulation that was applied on said signal for transmission via the out-of-band communication channel acted.

5. The method according to claim 1, characterized in that the master device checks the variations of magnitude of at least one parameter of the samples of each symbol period, by integrating said parameter over groups of samples formed by applying a sliding window within said symbol period and by determining differences between the integrated values of each said parameter for each couple of consecutive groups of samples within said symbol period.

6. The method according to claim 1, characterized in that the master device checks the variations of magnitude of at least one parameter of the samples of each symbol period, by determining differences between the values of each said parameter for each couple of consecutive samples within said symbol period.

7. The method according to claim 1, characterized in that the master device checks the variations of magnitude of at least one parameter of the samples of each symbol period, by determining a difference between a minimum value of each said parameter and a maximum value of each said parameter within said symbol period.

8. An information storage medium storing a computer program comprising program code instructions which can be loaded in a programmable device for implementing the method according to claim 1, when the program code instructions are run by the programmable device.

9. A master device adapted for detecting collisions in an out-of-band communication channel, the master device being intended to be used in an optical communications network further comprising slave devices connected to the master device via optical fiber, the optical communications network being adapted to enable in-band communications, the out-of-band communication channel being intended to enable transmissions of signalling information with respect to the in-band communications in the form of modulation symbols over successive symbol periods, collisions occur in the out-of-band communication channel when plural slave devices access the out-of-band communication channel by using respective carrier wavelengths that match each other, characterized in that the master device comprises:

a receiver to receive a signal via the out-of-band communication channel;

an oversampling circuitry to oversample the received signal starting from an instant of reception of said signal, so as to obtain samples thereof, by using a frequency that corresponds to a sampling frequency used for the in-band communications, or to a submultiple derived therefrom, such that the quantity of samples thus obtained per symbol period is enough high to consider that noise over the out-of-band communication channel is self-compensated over said quantity of samples;

a checking circuitry to check variations of magnitude of at least one parameter of the samples on a per symbol period basis, each said parameter being one parameter among amplitude, phase, and frequency and being chosen for checking said variations according to the modulation that was applied on said signal for transmission via the out-of-band communication channel; and a detector to detect a collision when the variations of each said parameter are greater than a predefined threshold equal to or greater than noise variance over the out-of-band communication channel regarding said parameter.

* * * * *